United States Patent [19]

Strain

[11] Patent Number: 5,729,075

[45] Date of Patent: Mar. 17, 1998

[54] TUNEABLE MICROELECTROMECHANICAL SYSTEM RESONATOR

[75] Inventor: Robert J. Strain, San Jose, Calif.

[73] Assignee: National Semiconductor Corporation, Santa Clara, Calif.

[21] Appl. No.: 862,571

[22] Filed: May 23, 1997

Related U.S. Application Data

[63] Continuation of Ser. No. 490,500, Jun. 12, 1995, abandoned.

[51] Int. Cl.$^6$ .................. G01L 1/10; G01H 9/00
[52] U.S. Cl. .................. 310/309; 250/306; 250/126; 73/862.59; 73/653; 310/316
[58] Field of Search .................. 310/309, 311, 310/316; 250/306; 73/862.59, 514.26, 505, 517 R, 778, 702, 704

[56] References Cited

U.S. PATENT DOCUMENTS

| 3,413,573 | 11/1968 | Nathanson et al. | 322/178 |
|---|---|---|---|
| 3,533,022 | 10/1970 | Engler et al. | 333/186 |
| 4,381,672 | 5/1983 | O'Connor et al. | 73/505 |
| 4,565,940 | 1/1986 | Hubbard, Jr. | 310/326 |
| 5,009,111 | 4/1991 | West et al. | 73/862.61 |
| 5,060,526 | 10/1991 | Barth et al. | 73/862.59 |
| 5,090,254 | 2/1992 | Guckel et al. | 73/862.59 |
| 5,138,216 | 8/1992 | Woodruff et al. | 310/316 |
| 5,329,271 | 7/1994 | Inuzuka et al. | 338/4 |
| 5,396,066 | 3/1995 | Ikeda et al. | 250/306 |
| 5,417,115 | 5/1995 | Burns | 73/778 |
| 5,461,918 | 10/1995 | Mozurkewich | 73/514.26 |
| 5,511,427 | 4/1996 | Burns | 73/708 |
| 5,658,698 | 8/1997 | Yagi et al. | 430/11 |

Primary Examiner—Thomas M. Dougherty
Assistant Examiner—Tran N. Nguyen
Attorney, Agent, or Firm—Skjerven, Morrill, MacPherson, Franklin & Friel; Edward C. Kwok

[57] ABSTRACT

A resonant beam or cantilever is implemented in single crystal silicon or polysilicon. Adjacent the end of the cantilever is an electrode capable of receiving a variable voltage. The cantilever has a natural mechanical resonant frequency when vibrated, and the varying electrostatic field resulting from the variation of applied voltage to the electrode is used to alter the natural restoring force of the cantilever so that a chosen vibration frequency of the cantilever can be achieved. Such vibrating cantilever can be used as the bases for a voltage control oscillator.

13 Claims, 2 Drawing Sheets

TUNEABLE MICROELECTROMECHANICAL SYSTEM RESONATOR

This application is a continuation application Ser. No. 08/490,500, filed Jun. 12, 1995, now abandoned.

FIELD OF THE INVENTION

This invention relates to a tunable resonator, and more particularly, to such a resonator which is implementable in semiconductor technology.

Background of the Invention

A common element in communication circuits is a phase locked loop for carrier recovery. Such a phase locked loop typically includes several elements, i.e., a programmable counter, a phase detector, and a voltage controlled oscillator (VCO). Of these elements the VCO has been the most troublesome to integrate, particularly when such a VCO requires a low level of phase jitter, in turn requiring a high Q resonant circuit. Classically, such a VCO is undertaken with an active circuit, an inductor, and a varactor, all in a hybrid device.

MicroElectro Mechanical Systems (MEMS) technology offers solutions to overcome the prior difficulties, by providing a fully integrated, extremely small yet efficient voltage controlled oscillator.

SUMMARY OF THE INVENTION

The present invention includes a beam or cantilever implemented in single crystal silicon or polysilicon. Adjacent the end of the cantilever is an electrode capable of receiving a charge, which level of charge can be varied so that the electrostatic field provided thereby is variable. The cantilever has a certain natural mechanical resonant frequency when vibrated, but of course such vibration will be damped out by internal friction. The electrostatic field of the electrode provides a restoring force to the cantilever when the cantilever is moved from its rest position, and upon proper sizing of the electrostatic field, such field can be used to reinforce the natural restorative force of the cantilever to in turn provide a chosen vibration frequency for the cantilever which is higher then the natural vibrating frequency and which actual frequency can be varied by an applied voltage. Such vibrating cantilever can be used as the basis for a voltage controlled oscillator.

DESCRIPTION OF THE PREFERRED EMBODIMENT

Figure 1:
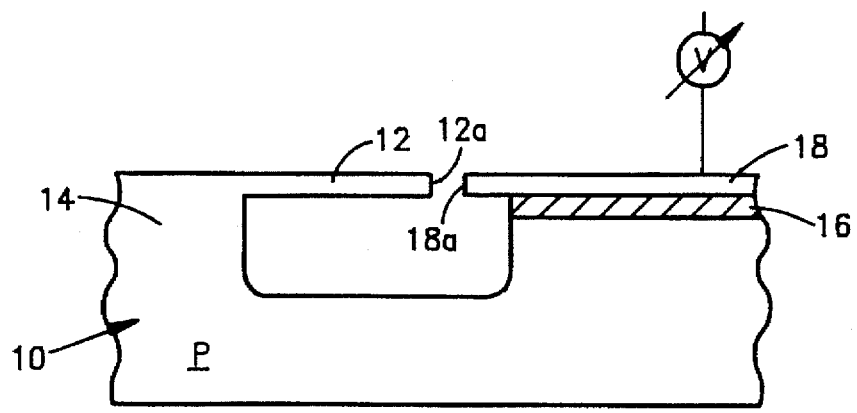
FIG. 1 is a sectional view of a first embodiment of the device.

With reference to FIG. 1, a layer 10 of single crystal silicon is provided in a semiconductor device, i.e., for example an epitaxial layer. Through appropriate masking and etching, a beam or cantilever 12 is defined, which connects to a substrate portion 14. The layer of silicon 10 may alternatively be polysilicon, with the cantilever in turn being polysilicon. In keeping with the MEMS technology, the cantilever 12 has a maximum cross-sectional area of for example 20 square microns. The cantilever 12 is flexible to an extent, and thus can be moved from its normal mechanical rest position as shown in FIG. 1 to a position above or below that rest position, and the natural stiffness of the cantilever 12 provides a restoring force thereto to tend to move it toward its normal rest position. Thus, if the cantilever 12 were moved upward in FIG. 1 and released, it would vibrate down past its rest position, up past its rest position, etc. until ending movement at its rest position due to natural internal mechanical damping.

A part of the substrate portion 14 adjacent the end 12a of the cantilever 12 has provided thereon a layer of oxide 16, and in turn a metal or polysilicon tuning electrode 18 is provided over the layer of oxide 16, the end 18a of the electrode 18 being adjacent the end 12a of the cantilever 12.

By means of an applied voltage, the electrode 18 is provided with a charge of a given polarity type, and is insulated from the substrate portion 14 by the oxide layer 16. This applied voltage cause an opposite charge to be induced in the cantilever 12. A variable voltage can be applied to the electrode 18 by well-known means.

Figure 3:
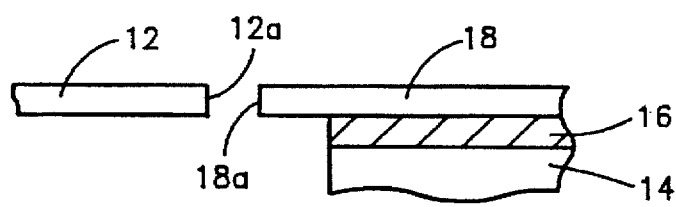
FIGS. 3 and 4 are sectional views of portions of the device showing basic principles of operation of the invention of FIGS. 1 and 2.
Figure 4:
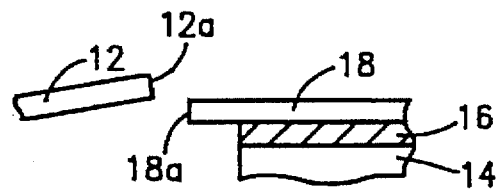

With reference to FIGS. 3 and 4, FIG. 3 shows the positioning of elements of FIG. 1 with the cantilever 12 in its mechanical rest position, and with the opposite charges induced in the cantilever 12 and electrode 18 by an applied voltage difference as set forth above. If the cantilever 12 is moved to the position shown in FIG. 4, the electrostatic field generated by the charge on the end 18a of electrode 18 acts on the charge on the end 12a of the cantilever 12 perpendicular to the longitudinal axis of the cantilever 12 to act as a restoring force to tend to move the cantilever 12 back to its normal mechanical rest position. In fact, the force perpendicular to the cantilever 12, i.e., that force tending to move it back to its rest position, increases in direct proportion to its deflection over the useful ranges of deflection.

The cantilever 12 has a natural resonant frequency which is related to the natural mechanical restoring force of the cantilever 12 and the mass of the cantilever 12. This natural resonant frequency is increased by the electrostatic forces between the end 12a of the cantilever 12 and the end 18a of electrode 18.

Because the inevitable frictional forces within the cantilever tend to damp any vibration over time, this element must be incorporated within an electrical circuit that will provide enough energy to the cantilever to sustain oscillation at its resonant frequency. Such a circuit has three basic elements, a sensor that converts mechanical displacement of the cantilever into an electrical signal, an electronic amplifier that increases the amplitude of that signal and provides an output, and the electrode 18 capable of imposing vibratory force on the cantilever 12.

Figure 2:
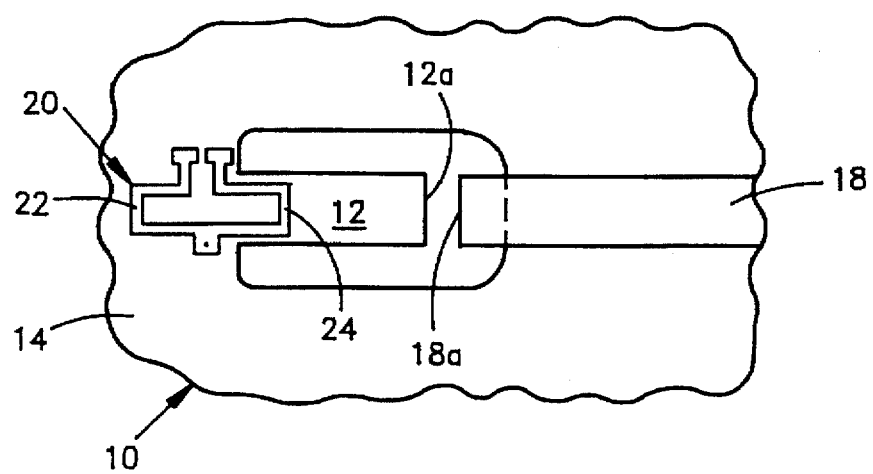
FIG. 2 is a plan view of the device of FIG. 1.
Figure 5:
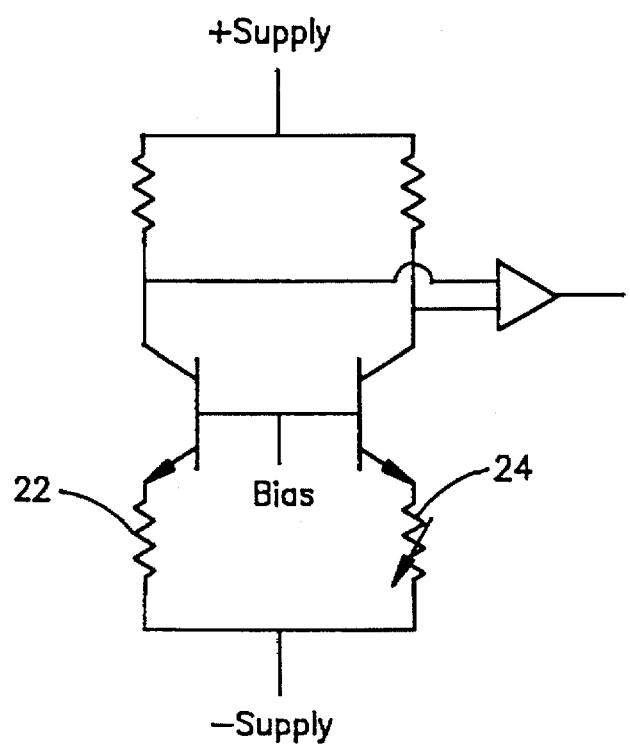
FIG. 5 is a schematic view of a circuit which may incorporate the invention.

In order to electrically determine the displacement of the cantilever 12, a resistive stress indicator can be created by incorporation of a resistor structure in the form of a shallow diffuse layer 20 in the substrate portion 14 adjacent to the cantilever 12, as shown in FIG. 2. This resistor structure 20 is made up of a matched pair of resistors 22, 24. The resistance of the resistor 24 will vary with the displacement of the cantilever 12, while the resistance of the other resistor 22 will remain constant. By using a differential circuit as shown in FIG. 5, a voltage may be created which is proportional to the cantilever displacement. This signal is provided to an amplifier, the output signal of which is provided to the electrode 18.

Figure 6:
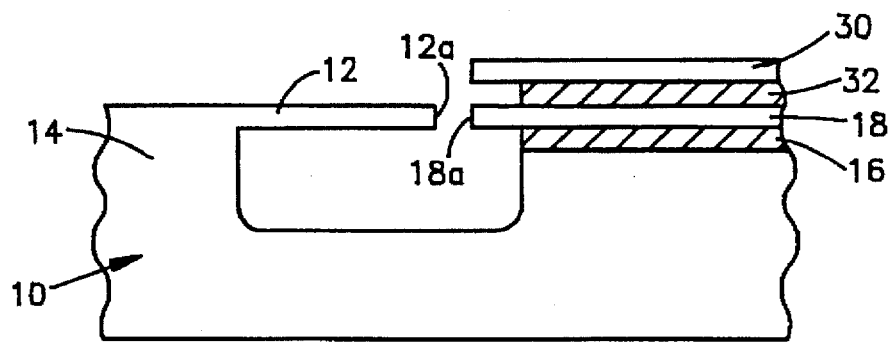
FIG. 6 is a sectional view of a more complete embodiment of the invention.

A second metal or polysilicon electrode 30 (FIG. 6) may be provided, out of the plane of the cantilever 12, and disposed on a second oxide layer 32 which is in turn disposed on the first electrode 16. This electrode 30 can be used to stimulate vibration of the cantilever 12 from its natural mechanical rest position by being provided with a polarity such that an initial charge thereon will move the cantilever 12 from its rest position to a deflected position, then allowing the electrode 18 to take over to provide continued oscillation of the cantilever.

I claim:

1. A vibratory structure comprising:
    a substrate portion;
    a flexible cantilever connected to the substrate portion, at least a portion of the cantilever capable of carrying an electrical charge of a first polarity, the cantilever having an inherent rest position relative to the substrate portion, and, when deflected from such rest position to a deflected position relative to the substrate portion, having an inherent mechanical restoring force which varies with a displacement between said deflected position and said rest position;
    an electrode adjacent the cantilever for generating an electric charge of a second polarity in accordance with an input voltage to said electrode so that an electric field may be generated by the electrical charge of said first polarity and said electrical charge of said second polarity, for applying a force to the so-charged cantilever portion with the cantilever in said deflected position so that the net restoring force on the cantilever is different from the inherent mechanical restoring force of the cantilever; and
    a piezoelectric sensor sensing said displacement for providing said input voltage, said input voltage varying with said displacement.

2. The structure of claim 1 wherein the cantilever is single crystal silicon.

3. The structure of claim 1 wherein the cantilever is polysilicon.

4. The structure of claim 1 wherein the cantilever has a maximum cross-sectional dimension of 20 square microns.

5. The structure of claim 1 wherein the force applied by such a generated electric field to the so-charged cantilever portion is substantially proportional to the extent of deflection of the cantilever from said rest position.

6. The structure of claim 1 wherein the electrode is mounted on an insulating layer in turn mounted on the substrate portion.

7. The structure of claim 1 where the electrode is metal.

8. The structure of claim 1 wherein the electrode is polysilicon.

9. The structure of claim 1 wherein said piezoelectric sensor comprising a resistor structure mounted to the substrate portion and a portion of the cantilever adjacent the substrate portion, the resistance thereon varying in accordance with the extent of the deflection of the cantilever.

10. A vibratory structure comprising:
    a substrate portion;
    a flexible cantilever connected to the substrate portion, at least a portion of the cantilever capable of carrying an electrical charge of a first polarity, the cantilever having an inherent rest position relative to the substrate portion, and, when deflected from such rest position to a deflected position relative to the substrate portion, having an inherent mechanical restoring force;
    a first electrode adjacent the cantilever for generating an electric charge of a second polarity so that an electric field may be generated by the electrical charge of the first polarity and the electrical charge of the second polarity, for applying a force to the so-charged cantilever portion with the cantilever in said deflected position so that the net restoring force on the cantilever is different from the inherent mechanical restoring force of the cantilever; and
    a second electrode mounted adjacent the first-mentioned electrode for generating an electric field of said second polarity for applying electrostatic force to the cantilever portion with the cantilever in said rest position relative to the substrate portion to move the cantilever from said rest position.

11. The structure of claim 10 wherein the second electrode is polysilicon.

12. The structure of claim 10 wherein the second electrode is metal.

13. The structure of claim 10 wherein the second electrode is mounted on an insulating layer in turn mounted on the first electrode.

* * * * *